FIP7912   XR   3,648,770

United States Patent
Sydansk et al.

[15] 3,648,770
[45] Mar. 14, 1972

[54] CONTROL OF WATER SOLUBILIZATION IN MICELLAR SOLUTIONS

[72] Inventors: Robert D. Sydansk; Karl D. Dreher, both of Littleton, Colo.

[73] Assignee: Marathon Oil Company, Findlay, Ohio

[22] Filed: July 9, 1970

[21] Appl. No.: 53,698

[52] U.S. Cl....................................166/252, 166/275
[51] Int. Cl.............................................E21b 43/22
[58] Field of Search................166/252, 270, 273–275; 252/8.55 D

[56] References Cited

UNITED STATES PATENTS

| | | | |
|---|---|---|---|
| 3,275,075 | 9/1966 | Gogarty et al.............. | 166/275 UX |
| 3,371,710 | 3/1968 | Harvey et al................ | 166/274 X |
| 2,841,222 | 7/1958 | Smith.......................... | 252/8.55 D X |
| 3,175,610 | 3/1965 | Osoba.......................... | 166/270 |
| 3,330,343 | 7/1967 | Tosch et al.................. | 166/273 |
| 3,491,834 | 1/1970 | Ahearn et al............... | 166/274 X |
| 3,493,047 | 2/1970 | Davis et al.................. | 166/252 |

*Primary Examiner*—Stephen J. Novosad
*Attorney*—Joseph C. Herring, Richard C. Willson, Jr. and Jack L. Hummel

[57] ABSTRACT

Improved flooding of a subterranean reservoir with a micellar dispersion is effected by first analyzing the interstitial water within the reservoir for the predominant cation, then designing the micellar dispersion (contains hydrocarbon, petroleum sulfonate and water, and optionally cosurfactant) to contain a cation which has a greater affinity for the petroleum sulfonate than the cation within the interstitial water, and then injecting and displacing the micellar dispersion through the reservoir. Examples of cations useful in the micellar dispersion include $Li^+$, $Na^+$, $NH_4^+$, $K^+$, $Mg^{++}$, $Ca^{++}$, $Sr^{++}$, and $Ba^{++}$. Where the predominant cation within the interstitial water is one within the above list, then the cation to be incorporated within the micellar dispersion can be one higher in the sequence, i.e., from left to right, than the predominant cation.

10 Claims, No Drawings

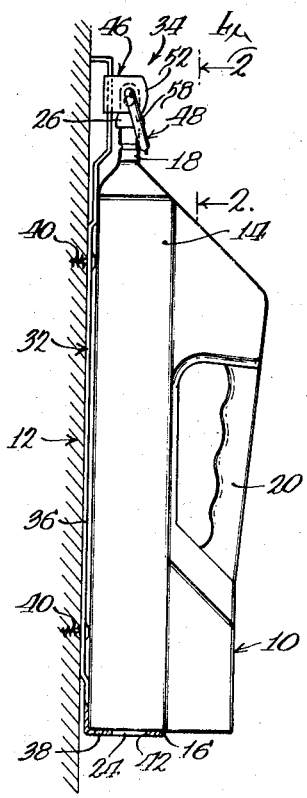

CONTROL OF WATER SOLUBILIZATION IN MICELLAR SOLUTIONS

BACKGROUND OF THE INVENTION

1. Field of the Invention

This invention relates to injecting a micellar dispersion into a subterranean reservoir, displacing it toward a production means to recover crude oil through the production means. The micellar dispersion contains hydrocarbon, surfactant, water, electrolyte, and optionally, cosurfactant. The micellar dispersion is designed so that it will not degrade upon contacting salts within the interstitial water.

2. Description of the Prior Art

U.S. Pat. No. 3,343,597 to Gogarty et al. teaches an improved method of flooding a reservoir with a displacing agent, e.g., micellar systems, emulsions, and soluble oils, by injecting an aqueous slug of controlled ionic content into the formation prior to the injection of the displacing slug. They teach that micellar dispersions tend to break down upon contact with various ions in the formation waters. But, Gogarty et al. overcomes this adversity by preinjecting the aqueous slug of water containing ions to "insulate" the displacing agent from the salts within the interstitial water.

U.S. Pat. No. 3,507,331 to Jones teaches an improved flooding process wherein a displacing agent containing cosurfactant and/or electrolyte is followed by a drive fluid containing consurfactant and/or electrolyte within the front portion thereof. The components within the drive fluid prevent the drive fluid from "leaching" the water soluble consurfactant and/or electrolyte within the back portion of the displacing agent.

SUMMARY OF THE INVENTION

Improved flooding of a subterranean reservoir is obtained by first sampling the reservoir waters for the predominant cation, then incorporating within a micellar dispersion (containing hydrocarbon, petroleum sulfonate and water) a cation which has a greater affinity for the petroleum sulfonate than the predominant cation within the interstitial water. For example, if sodium is the predominant cation within the interstitial water, then the cation incorporated within the micellar dispersion can be $NH_4^+$, $K^+$, $Mg^{++}$, $Ca^{++}$, $Sr^{++}$, or $Ba^{++}$. If the predominant cation within the interstitial water is one within the group consisting of $Li^+$, $Na^+$, $NH_4^+$, $K^+$, $Mg^{++}$, $Ca^{++}$, $Sr^{++}$, or $Ba^{++}$, then the cation to be incorporated within the micellar dispersion can be selected from this same group but should be higher in the sequence, from left to right, than the predominant cation. By so designing the micellar dispersion, the stability of the micellar dispersion to the interstitial water is improved and improved oil recovery results are obtained.

DESCRIPTION OF THE PREFERRED EMBODIMENTS

It is known in the art that micellar dispersions composed of hydrocarbon, petroleum sulfonate, water, and optionally consurfactant and/or electrolyte are useful to recover crude oil from reservoirs. Such dispersions are especially useful in tertiary recovery processes. Examples of useful micellar dispersions and methods of designing same are taught in the art, as are the numerous hydrocarbons, petroleum sulfonates, cosurfactants, electrolytes, etc.—see U.S. Pat. Nos. 3,254,714 to Gogarty et al., 3,297,084 to Gogarty et al., 3,307,628 to Sena; 3,330,343 to Tosch et al., 3,497,006 to Jones et al., and 3,506,070 to Jones. The surfactant within the micellar dispersion is preferably petroleum sulfonate; however, other anionic surfactants are also useful. Examples of useful anionic surfactants include those defined in the above patents.

The following examples teach specific micellar dispersions containing different amounts and kinds of cations in the micellar dispersion. These examples are not intended to limit the invention in any way; rather, all equivalents obvious to those skilled in the art are intended to be incorporated within the scope of the invention as generally defined within the specification and appended claims. In these examples, where the micellar dispersion does not "takeup" all of the water, it is assumed that the electrolyte concentration within the water of the micellar dispersion is the same concentration as in the water phase below the micellar dispersion. Where the micellar dispersion contains a "high" equivalent weight sulfonate (e.g., about 450–525), the volume of water solubilized reflects the affinity of each cation for the sulfonate. With "low" equivalent weight sulfonates (e.g., 350–450), the volume of hydrocarbon solubilized reflects the affinity of each cation for the sulfonate. The design of each of the dispersions is based on these sequences. Unless otherwise specified, all percents are based on volume.

EXAMPLE I

An oil-external micellar dispersion is obtained by mixing 10 wt. percent of an ammonium petroleum sulfonate having an average equivalent weight of about 470, 25 percent water containing 5,000 p.p.m. of the below-indicated electrolyte, 65 percent of hydrocarbon (composed of vehicle oil from the petroleum sulfonate and n-decane). With certain electrolytes within the water, a water phase forms at the bottom of the micellar dispersion. Compositions of the resulting oil-external micellar dispersions containing the particular electrolytes are indicated in Table 1:

TABLE 1

| Electrolyte | Composition of Micellar Dispersion | | |
|---|---|---|---|
| | % $H_2O$ | % Sulfonate | % Hydrocarbon |
| LiCl | 25 | 10 | 65 |
| NaCl | 25 | 10 | 65 |
| $NH_4Cl$ | 25 | 10 | 65 |
| KCl | 25 | 10 | 65 |
| $MgCl_2$ | 21.9 | 10.3 | 67.1 |
| $CaCl_2$ | 18.9 | 10.7 | 69.2 |
| $SrCl_2$ | 17.0 | 10.9 | 70.6 |
| $BaCl_2$ | 16.0 | 11.0 | 71.5 |

EXAMPLE II

The procedure of Example I is repeated except the water contains 10,000 p.p.m. electrolyte. The final composition of the oil-external micellar dispersions is indicated in Table 2:

TABLE 2

| Electrolyte | Composition of Micellar Dispersion | | |
|---|---|---|---|
| | % $H_2O$ | % Sulfonate | % Hydrocarbon |
| LiCl | 22.0 | 10.3 | 67 |
| NaCl | 21.0 | 10.4 | 67.7 |
| $NH_4Cl$ | 20.0 | 10.5 | 68.4 |
| KCl | 19.4 | 10.6 | 68.9 |
| $MgCl_2$ | 18.5 | 10.7 | 69.5 |
| $CaCl_2$ | 17.2 | 10.8 | 70.5 |
| $SrCl_2$ | 15.0 | 11.1 | 72.2 |
| $BaCl_2$ | 14.8 | 11.1 | 72.3 |

EXAMPLE III

An oil-external micellar dispersion is obtained by mixing 10 wt. percent of an ammonium petroleum sulfonate having an average equivalent weight of about 400, 40 percent water containing 5,000 p.p.m. of electrolyte, 47 percent hydrocarbon (vehicle oil in the petroleum sulfonate plus n-decane) and 3 percent n-amyl alcohol. The compositions of the micellar dispersions for the particular electrolytes are indicated in Table 3:

TABLE 3

| Electrolyte | Composition of Micellar Dispersion | | | |
|---|---|---|---|---|
| | % H$_2$O | % Sulfonate | % Hydrocarbon | % nAA |
| LiCl | 32.5 | 10.8 | 50.9 | 3.25 |
| NaCl | 30.9 | 11.0 | 51.7 | 3.3 |
| NH$_4$Cl | 29.0 | 11.2 | 52.9 | 3.37 |
| KCl | 27.5 | 11.4 | 53.6 | 3.42 |
| MgCl$_2$ | 25.4 | 11.7 | 55.1 | 3.51 |
| CaCl$_2$ | 23.4 | 12.0 | 56.3 | 3.6 |
| SrCl$_2$ | 21.5 | 12.3 | 57.6 | 3.68 |
| BaCl$_2$ | 20.5 | 12.4 | 58.4 | 3.73 |

EXAMPLE IV

A water-external micellar dispersion is obtained by mixing 10 weight percent of ammonium petroleum sulfonate having an average equivalent weight of about 400, 40 percent by volume water containing about 5,000 p.p.m. of electrolyte dissolved in the water, 50 percent by volume of hydrocarbon (vehicle oil from the petroleum sulfonate plus n-decane). The resulting composition of the micellar dispersion with the particular electrolyte is indicated in Table 4:

TABLE 4

| Electrolyte | Composition of Micellar Dispersion | | |
|---|---|---|---|
| | % hydrocarbon | % sulfonate | % H$_2$O |
| LiCl | 22.8 | 13.7 | 54.9 |
| NaCl | 23.8 | 13.6 | 54.2 |
| NH$_4$Cl | 26.5 | 13.1 | 52.3 |
| KCl | 28.0 | 12.8 | 51.3 |
| MgCl$_2$ | 25.6 | 13.2 | 52.9 |
| CaCl$_2$ | 29.0 | 12.7 | 50.6 |
| SrCl$_2$ | 30.5 | 12.4 | 49.7 |
| BaCl$_2$ | 31.7 | 12.3 | 49.0 |

EXAMPLE V

An oil-external micellar dispersion is obtained by mixing 10 wt. percent of a petroleum sulfonate having an average equivalent weight of about 400, 70 percent water containing about 5,000 p.p.m. of electrolyte dissolved in the water, 17 percent hydrocarbon (vehicle oil from the petroleum sulfonate plus n-decane), and 3 percent n-amyl alcohol. The resulting composition of the micellar dispersion with the particular electrolyte is indicated in Table 5:

TABLE 5

| Electrolyte | Composition of Micellar Dispersion | | | |
|---|---|---|---|---|
| | % H$_2$O | % Sulfonate | % Hydrocarbon | % nAA |
| LiCl | 58.3 | 11.3 | 19.3 | 3.4 |
| NaCl | 57.6 | 11.4 | 19.4 | 3.42 |
| NH$_4$Cl | 56.4 | 11.6 | 19.7 | 3.47 |
| KCl | 55.0 | 11.8 | 20.0 | 3.53 |
| MgCl$_2$ | 37.0 | 14.9 | 25.4 | 4.48 |
| CaCl$_2$ | 35.9 | 15.2 | 25.8 | 4.55 |
| SrCl$_2$ | 33.5 | 15.8 | 26.8 | 4.72 |
| BaCl$_2$ | 31.0 | 16.4 | 27.8 | 4.91 |

EXAMPLE VI

A water-external micellar dispersion is obtained by mixing 10 wt. percent of an ammonium petroleum sulfonate having an average equivalent weight of about 400, 70 percent water containing about 5,000 p.p.m. of electrolyte dissolved in the water, 20 percent hydrocarbon (vehicle oil from the petroleum sulfonate plus n-decane). The resulting composition of the micellar dispersion with the particular electrolyte is indicated in Table 6:

TABLE 6

| Electrolyte | Composition of Micellar Dispersion | | |
|---|---|---|---|
| | % hydrocarbon | % sulfonate | % H$_2$O |
| LiCl | 13.4 | 10.7 | 74.9 |
| NaCl | 14.9 | 10.5 | 73.7 |
| NH$_4$Cl | 15.3 | 10.5 | 73.4 |
| KCl | 17.0 | 10.3 | 72.2 |
| MgCl$_2$ | 20 | 10 | 70 |
| CaCl$_2$ | 20 | 10 | 70 |
| SrCl$_2$ | 20 | 10 | 70 |
| BaCl$_2$ | 20 | 10 | 70 |

The above examples are illustrative of micellar dispersions containing different electrolytes and different concentrations of hydrocarbon and water with preferred equivalent weight petroleum sulfonates. Such micellar dispersions are useful to recover hydrocarbon from reservoirs.

What is claimed is:

1. An improved method of flooding a subterranean reservoir having at least one injection means in fluid communication with at least one production means and wherein a micellar solution comprised of hydrocarbon, anionic surfactant, and water is injected into the reservoir and displaced toward the production means to recover crude oil therefrom, the method comprising:
  1. analyzing a representative sample of the interstitial water within the reservoir for the predominant cation within the water,
  2. designing the micellar solution to include a water soluble salt which contains a cation which has a greater affinity for the anionic surfactant than the predominant cation within the interstitial water.

2. The process of claim 1 wherein the predominant cation in the interstitial water is Li$^+$, Na$^+$, NH$_4^+$, K$^+$, Mg$^{++}$, Ca$^{++}$, Sr$^{++}$, or Ba$^{++}$.

3. The process of claim 1 wherein the cation incorporated into the micellar solution includes one selected from the group consisting of Li$^+$, Na$^+$, NH$_4^+$, Mg$^{++}$, Ca$^{++}$, Sr$^{++}$, or Ba$^{++}$.

4. The process of claim 3 wherein the cation incorporated within the micellar dispersion is higher in the sequence, from left to right, of the group than the predominant cation in the interstitial water.

5. The process of claim 1 wherein the micellar solution contains consurfactant.

6. The process of claim 1 wherein the surfactant is petroleum sulfonate having an average equivalent weight of about 400 to about 470.

7. The process of claim 1 wherein the predominant cation in the interstitial water is Li$^+$, Na$^+$, NH$_4^+$, K$^+$, Mg$^{++}$, Ca$^{++}$, Sr$^{++}$, or Ba$^{++}$.

8. The process of claim 1 wherein the cation incorporated into the micellar solution includes one selected from the group consisting of Li$^+$, Na$^+$, NH$_4^+$, Mg$^{++}$, Ca$^{++}$, Sr$^{++}$, or Ba$^{++}$.

9. An improved method of flooding a subterranean reservoir having at least one injection means in fluid communication with at least one production means and wherein a micellar solution comprised of hydrocarbon, petroleum sulfonate, and water is injected into the reservoir and displaced toward the production means to recover crude oil therefrom, the method comprising:
  1. analyzing a representative sample of the interstitial water within the reservoir for the predominant cation within the water,
  2. designing the micellar solution to include a water soluble salt which contains a cation which has a greater affinity for the petroleum sulfonate than the predominant cation within the interstitial water.

10. The process of claim 7 wherein the micellar solution contains cosurfactant.

* * * * *

UNITED STATES PATENT OFFICE
CERTIFICATE OF CORRECTION

Patent No. 3,648,770          Dated March 14, 1972

Inventor(s) Robert D. Sydansk and Karl D. Dreher

It is certified that error appears in the above-identified patent and that said Letters Patent are hereby corrected as shown below:

Delete drawing entirely, as it is inappropriate to this patent.

| | |
|---|---|
| Col. 1, line 30: | Delete "consurfactant" and insert --cosurfactant--. |
| Col. 4, line 51: | Delete "consurfactant" and insert --cosurfactant--. |
| Claim 10: | Delete "Claim 7" and insert --Claim 9--. |

Signed and sealed this 19th day of September 1972.

(SEAL)
Attest:

EDWARD M. FLETCHER, JR.
Attesting Officer

ROBERT GOTTSCHALK
Commissioner of Patents